Oct. 21, 1924.  1,512,060

E. T. SCHMUCKER

MEANS FOR HANDLING GREASE COMPOUNDS

Filed June 2, 1922

INVENTOR
E. T. Schmucker
BY
ATTORNEYS

Patented Oct. 21, 1924.

1,512,060

UNITED STATES PATENT OFFICE.

EARL TOBIAS SCHMUCKER, OF RAPID CITY, SOUTH DAKOTA.

MEANS FOR HANDLING GREASE COMPOUNDS.

Application filed June 2, 1922. Serial No. 565,476.

*To all whom it may concern:*

Be it known that I, EARL TOBIAS SCHMUCKER, a citizen of the United States, and a resident of Rapid City, in the county of Pennington and State of South Dakota, have invented a new and useful Improvement in Means for Handling Grease Compounds, of which the following is a full, clear, and exact description.

My invention relates to improvements in process and means for handling grease compounds and the like, and it consists in the steps hereinafter disclosed, and the combinations, constructions, and arrangements here-in described and claimed.

An object of my invention is to provide a process for handling grease compounds which will be able to deliver a predetermined quantity of grease.

A further object of my invention is to provide a process for handling grease compounds which makes use of means for delivering a desired quantity of grease and for conveying this quantity to the desired place.

A further object of my invention is to provide a process for handling grease which greatly reduces the amount of handling which in usually necessary.

A further object of my invention is to provide a process which makes use of a simple, efficient, and economical means for handling grease compounds.

A further object of my invention is to provide a novel grease gun which is adapted to show the amount of grease contained within the gun.

A further object of my invention is to provide a novel means for filling the grease gun with the desired amount of grease.

Other objects and advantages will appear in the following specification, and the novel features of the invention will be particularly pointed out in the appended claims.

My invention is illustrated in the accompanying drawings, forming part of this application, in which—

Figures 1, 3:
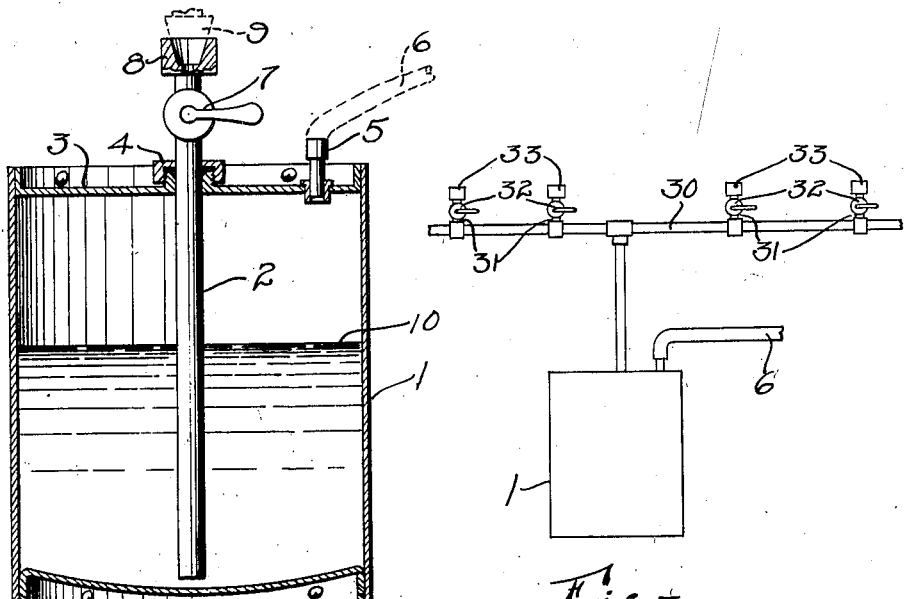
Figure 1 is a sectional view of a grease holding drum.
Figure 3 is a diagrammatic view of a modified form of the device.

In carrying out my invention, I provide a grease retaining drum 1 which is preferably made of metal and which has a centrally disposed outlet pipe 2 therein. The pipe 2 is rigidly secured to the cover 3 of the drum at 4. An air inlet 5 communicates with the top of the drum 1 and is adapted to be connected to a pipe 6 conveying compressed air. The pipe 2 extends substantially to the bottom of the drum 1 and has a manually controlled valve 7 disposed adjacent to the outer end thereof. The pipe 2 is fashioned into a socket 8 at its outer end and is adapted to receive the tapered end 9 of a grease gun. It is obvious from this construction that when compressed air is admitted into the drum 1, it will force the grease 10 in the drum out through the socket 8 when the valve 7 is opened. If desired, compressed air may be left on all of the time. The grease will be forced out through the socket 8 only when the valve 7 is opened.

Figure 2:
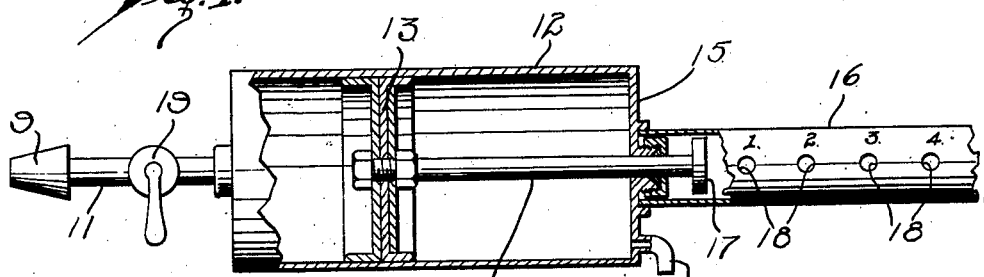
Figure 2 is a sectional view of a grease gun.

In Figure 2 I have shown the novel type of grease gun which is employed with the drum 1. As heretofore stated, this grease gun has a tapered mouth 9 which is carried by a pipe 11, this pipe communicating with the casing 12 of the gun. A plunger 13 is slidably disposed in the casing 12 and has a plunger rod 14 which projects through the end 15 of the casing 12 and extends into a cylindrical member 16 which is carried by the casing 12. A disc 17 is secured to the rod 14 and snugly engages with the wall of the cylindrical member 16. The cylinder 16 has openings 18 therein which are spaced from each other and are numbered 1, 2, 3, etc. A pin (not shown) is adapted to be disposed in any one of the openings 18 and stops the movement of the rod 14 when the disc 17 abuts the pin. In this manner, the numbers 1, 2, 3, etc., designate the quantity of grease by weight which is contained within the casing 12.

From the foregoing description of the various parts of the device, the operation thereof may be readily understood. The drum 1 containing grease may be filled at the grease manufacturing concern and be shipped to the desired destination. In filling the gun with the desired amount of grease, the end 9 is inserted into the socket 8 and the valves 7 and 19 are opened. The pressure of the air upon the grease in the drum 1 will force the grease through the pipe 2 and into the casing 12, the grease moving the plunger 13 as it is forced into the casing 12. The desired amount of grease has previously been determined and the pin disposed in any one of the openings 18. The air pressure will force the grease into the casing 12 until the disc 17 abuts the pin. The valves 7 and 19 may now be closed and the gun removed from the socket 8 and be carried to any place desired. The casing 12 has a pipe 20 communicating therewith to which a compressed air pipe may be attached. The gun may now be emptied of its contents by merely attaching the air pipe to the pipe 20 and opening the valve 19, whereupon the plunger 13 will be moved towards the tapered end 9 and will force the grease out through the opening in the tapered end. The weight of the amount of grease delivered by the end 9 is known, since the pin was inserted in any one of the desired openings 18, these openings designating the weight of the amount of grease contained within the casing 12.

In Figure 3 I have shown a modified form of the device in which a pipe 30 communicates with the drum 1 and has a plurality of branch pipes 31, these branch pipes being provided with valves and sockets 33. With this construction it will be observed that the drum 1 may be disposed out of sight, as for instance in the basement of a garage, and the pipe 30 which communicates therewith may be led to any part of the garage and have as many valve controlled outlet sockets 33 connected therewith as desired. It is obvious that the grease within the drum 1 will fill the pipe 30 and will be instantly discharged through the sockets 33 when they are opened. The grease gun may be inserted in any one of these sockets and be filled with the desired amount of grease in the manner heretofore described.

Figure 4:
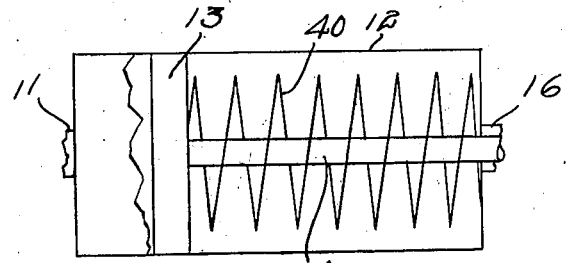
Figure 4 is a diagrammatic view of a modified form of grease gun.

In Figure 4 I have shown a modified form of the grease gun. The modified form is identical with the form shown in Figure 2 except in that a compression spring 40 is disposed in the casing 12 and tends to move the plunger 13 toward the outlet pipe 11. The grease in being forced into the casing 12 moves the plunger 13, which in turn compresses the spring 40. When the casing 12 is filled with the desired amount of grease, the valve 19 is closed and the grease within the casing 12 keeps the spring 40 compressed. As soon as the valve 19 is opened, however, the spring 40 will move the plunger 13 towards the outlet pipe 11 and will force the grease through the pipe. This construction does away with the compressed air in the pipe 20.

The device comprises a novel means for delivering a desired quantity of stored grease to a grease gun. As heretofore stated, the drum 1 may be replenished when empty, thereby providing a simple means of delivering grease from the manufacturer to the consumer. The grease gun which contains the desired amount of grease may be readily carried to any place desired and there be discharged of its contents. The graduated cylinder 16 provides a simple and effective means for determining the quantity of grease contained within the casing 12. In this manner, any desired amount of grease may be forced into the casing 12 and from there discharged into the working parts of the machine without the necessity of first weighing the amount of grease forced into the casing 12. The device may be readily installed in any garage or a like grease dispensing station, and is efficient and durable for the purpose intended.

I claim:

1. A grease gun comprising a grease containing casing having an outlet nozzle, said casing adapted to be filled with grease through said nozzle, a plunger slidably disposed within said casing and having a stem projecting through said casing, means for selectively engaging with said stem to determine the outward movement of said plunger, said plunger adapted to be moved by the grease entering the casing.

2. A grease gun comprising a grease containing casing having an outlet nozzle, said casing adapted to be filled with grease through said nozzle, a plunger slidably disposed within said casing and having a stem projecting through said casing, means for selectively engaging with said stem to determine the outward movement of said plunger, said plunger adapted to be moved by the grease entering the casing, and a valve for closing the inlet nozzle.

EARL TOBIAS SCHMUCKER.